March 4, 1924.                       1,485,471
O. A. SMITH
COMBINATION TOOL
Original Filed Oct. 26, 1921
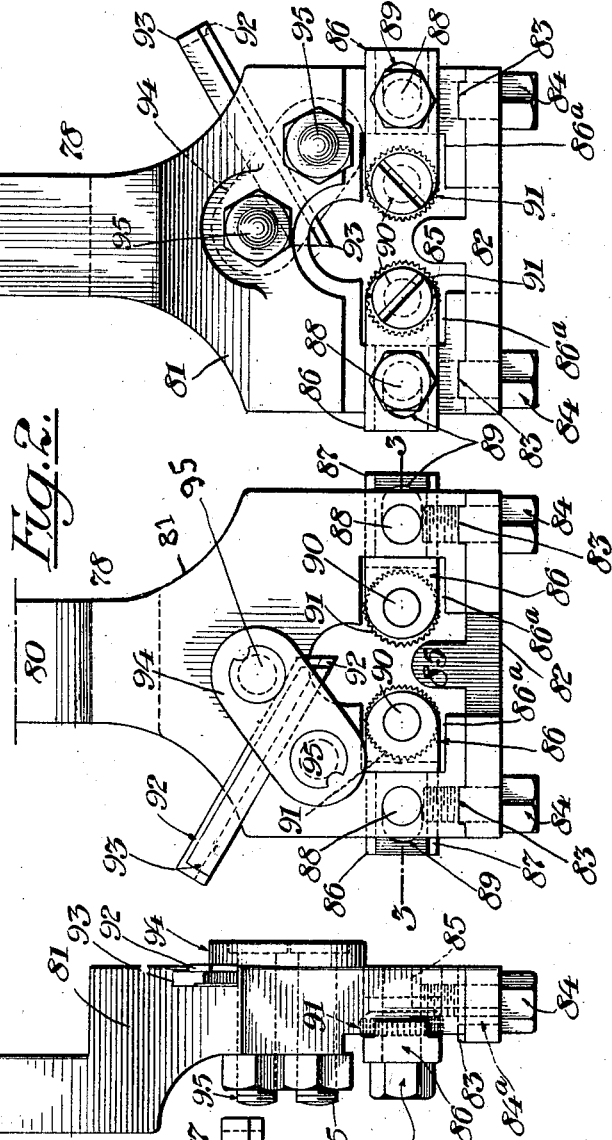
Inventor:
Oscar A. Smith
by his Attorneys
Weed & Gray Patented Mar. 4, 1924.

1,485,471

UNITED STATES PATENT OFFICE.

OSCAR A. SMITH, OF EAST CLEVELAND, OHIO, ASSIGNOR TO THE NATIONAL ACME COMPANY, OF CLEVELAND, OHIO, A CORPORATION OF OHIO.

COMBINATION TOOL.

Original application filed October 26, 1921, Serial No. 510,412. Divided and this application filed January 17, 1922. Serial No. 529,930.

*To all whom it may concern:*

Be it known that I, OSCAR A. SMITH, a citizen of the United States, residing at East Cleveland, in the county of Cuyahoga and State of Ohio, have invented certain new and useful Improvements in Combination Tools, of which the following is a specification.

This application is a division of my copending application for multiple spindle lathes, Serial No. 510,412, filed October 26, 1921, and relates to combination tools particularly designed and adapted for use in connection with multiple spindle machines, an object thereof being to provide an improved tool of this character combining mechanisms for accomplishing a large number of steps in the complete operation of turning out a finished article, such as for example a knurled nut, such mechanism including an improved organization and combination of side working tools and work stop, so constructed to operate in conjunction with the end working tools of the machine as to perform a large number of steps in a single cycle of operation.

A further object of this invention is to provide an improved combination tool comprising a tool holder adapted to carry one or more working tools, and a work stop also carried by the tool holder. In the present instance a shiftable side working combination tool is provided, the same being adapted to be supported adjacent to the work supporting means of the machine and also adapted to carry a plurality of successively operating tools, the work stop being carried by the tool holder in predetermined relation to the tools.

Further objects of this invention will appear in the following description thereof, reference being had to the accompanying drawing forming a part of this specification, wherein like reference characters indicate corresponding parts in the several views, and wherein Fig. 1 is a front view of the combination tool and work stop; Fig. 2 is a rear view thereof partly broken away; Fig. 3 is a horizontal section taken on line 3—3 of Fig. 2; Fig. 4 is a side elevation of the improved combination tool; and Fig. 5 is a detail plan view illustrating the position of the knurling tools with relation to the work.

Referring to the drawing, it will be seen that my improved combination tool and work stop 78 comprises a suitable shank portion 80 terminating at its lower end in an enlarged body portion 81. At the lower end of this body portion 81 is mounted a work stop 82, the same having suitable tongues 83 cooperating with tongue-ways machined in the body portion, the parts being secured together for transverse adjustment by means of suitable slots 84ª and screws 84. Thus, it will be readily seen that the position of the stop slide 82 may be readily and effectively adjusted relatively to the tool holder and the work. This stop slide 82 is provided with an integrally upwardly extending stop 85, which is adapted to act as a work stop proper. Above the stop slide the body portion 81 is cut away or recessed at each side of the center thereof, as at 86ª, for the purpose of housing a pair of adjustable slides 86. The latter are provided with suitable guide members 87 adapted to cooperate with guideways formed in the holder, the slides 86 being secured to the body portion as by means of bolts 88 and elongated slots 89 for adjustment relatively to each other. In suitable slots 90ª machined in the inner ends of these slides 86 and rotatably carried, as by means of suitable pivot screws 90, are knurling tools 91, the same being adjustable relatively to each other in accordance with the size of the work. Carried in a suitable angular slot directly above one of these knurling slides are a pair of tools 92 and 93, one thereof comprising a cut-off tool and the other a forming or beading tool. These tools are held in position by a suitable clamp plate 94 releasably held in position by means of bolts 95.

In Fig. 1 the outer side of the combination tool, or in other words the side opposed from the front face of the spindle, is illustrated and in Fig. 2 the inner side of the combination tool, or in other words the side next to the work and the front face of the spindle, is shown. Thus, as shown in Fig. 3 the stop 85 is shown in position whereby the outer face thereof will be substantially flush with the outer faces of the knurling slides 86, the inner face of the stop being located outside the vertical plane of the knurling tools or rollers 91.

It will be understood of course that by loosening the bolts 88 the knurling rollers may be adjusted in any suitable relative position, so as to accommodate varying sizes of stock, and that by loosening the clamping plate 94 the cut-off and forming tools 92—93 may be adjusted as desired. Also by loosening the bolts 84 the stop slide 82 may be adjusted relatively to the work, the slots 84ª being sufficiently elongated to permit such transverse adjustment.

In operation it will be understood that the combination tool is suitably secured to the vertical or side working tool slide of the machine and that the combination tool is caused to travel downwardly so as to carry the stop 85 into proper operative position so that when the work bar is fed forward it will come to a stop against the adjustable stop. After the work bar has been gripped by the chucking mechanism, the combination tool is again caused to travel downwardly so as to carry the knurling tools 91, which have been adjusted laterally for size over the work bar 100 to knurl the same. At this time the desired travel of the combination tool is again arrested and the work bar 100 is drilled as described in my copending application above mentioned. Thereupon the combination tool 78 is again shifted downwardly and the cut-off blade 92 comes in contact with the work bar, severing the finished knurled nut from the work bar. The continued downward travel of the vertical slide with the combination tool 78 carries the beading or grooving blade 93 into contact with the end of the bar 100 protruding from the work spindle and forms the bead or groove 101 in the work bar for the succeeding nut to be operated upon after the bar is fed forward again.

Of course it is understood that these cut-off and forming tools or blades must be adjusted and spaced away from each other a proper distance, and that the blades are formed to a suitable shape for the desired work, and that the knurling tools are adjusted the proper spaced distance relative to each other, and that the stop 85 is also adjusted properly.

I claim as my invention:

1. A tool holder comprising an enlarged body member having means for attachment to a tool slide of a machine, a work stop carried by said body member and having the work engaging part thereof extending above the bottom of said member, and a tool carried by said body member and terminating above said work stop.

2. A tool holder comprising a shank terminating in an enlarged body portion, a work stop extending in a plane above the lower edge of said body portion, and a plurality of tools carried by said body portion and having the work engaging parts thereof located one above the other and also above said work stop.

3. A tool holder adapted to be connected to a tool slide of a machine and having at one end an enlarged body portion provided with an inwardly extending recess, and a work stop and one or more tools carried by said body portion and terminating in the recess.

4. A tool holder comprising a body portion having means for attachment to a tool slide of a machine and having a work stop supporting member extending transversely across the bottom of said body portion and connected thereto.

5. A combination tool comprising a tool holder adapted to be connected to a tool slide of a machine and having at one end an enlarged body portion provided with an inwardly extending recess, a work stop bar connected to said body portion and having a stop member terminating in the recess, and a tool mounted on said body portion and also terminating in said recess.

6. A combination tool comprising a tool holder adapted to be connected to a tool slide of a machine, three or more means mounted upon said holder and adapted for predetermined engagement with the work, said means being so mounted in fixed relative position as to successively engage the work upon shifting the tool holder.

7. A combination tool comprising a tool holder adapted to be connected to a tool slide of a machine, three or more means carried by said holder and adapted for predetermined engagement with the work, said means being so mounted in fixed relative position as to successively engage the work upon shifting the tool holder, one of said means comprising a work stop.

8. A combination tool comprising a tool holder adapted to be connceted to a tool slide of a machine, three or more means carried by said holder and adapted for predetermined engagement with the work, said means being so mounted in fixed operative position as to successively engage the work upon shifting the tool holder, one of said means comprising adjustable knurling mechanism.

9. A combination tool comprising a tool holder having a body portion provided with means for attachment to the tool slide of a machine, a work stop supporting member carried by said body portion, a tool adjustably mounted in said body portion and having the work engaging part thereof located above the bottom of said body portion.

10. A tool holder comprising a body portion having means for attachment to the tool slide of a machine, said body portion having an inwardly extending recess, and a work engaging element extending transversely into said recess.

11. A tool holder comprising an enlarged body portion having means for attachment to the tool slide of a machine, three or more work engaging elements carried by said body portion and having the work engaging parts thereof located one above the other and above the bottom of said body portion.

12. A combination tool comprising a tool holder adapted to be connected to the tool slide of a machine, a plurality of fixed work engaging elements carried by said tool holder and comprising knurling, forming and cut-off mechanism, and a work stop.

13. A combination tool comprising a tool holder adapted to be connected to the tool slide of a machine, a plurality of fixed work engaging elements carried by said tool holder and comprising knurling, forming and cut-off mechanism, and a work stop, some or all of said elements being so mounted relatively one to another as to operate successively upon the work.

14. A combination tool for a metal working machine comprising a tool holding bar, forming, knurling and cut-off mechanism carried by said bar, and a work stop supported in operative relation thereto, said stop and mechanism being mounted in relatively fixed operative relation.

15. A combination tool for a metal working machine comprising a tool holder having an enlarged recess at one end thereof, a stop and one or more tools carried by said holder and terminating in said recess in relatively fixed position.

Signed at Cleveland, Ohio, this 6th day of January, 1922.

OSCAR A. SMITH.